US006753386B1

(12) United States Patent
Yahkind et al.

(10) Patent No.: US 6,753,386 B1
(45) Date of Patent: Jun. 22, 2004

(54) POLYURETHANE POLYOLS AND COATINGS THEREOF HAVING REDUCED VISCOSITY

(75) Inventors: Alexander Leo Yahkind, W. Bloomfield, MI (US); Ian Wagstaff, Troy, MI (US); Frederick Herbert Walker, Doylestown, PA (US)

(73) Assignee: Akzo Nobel N.V., Arnhem (NL)

( * ) Notice: Subject to any disclaimer, the term of this patent is extended or adjusted under 35 U.S.C. 154(b) by 0 days.

(21) Appl. No.: 08/991,514

(22) Filed: Dec. 16, 1997

Related U.S. Application Data

(63) Continuation-in-part of application No. 08/483,134, filed on Jun. 7, 1995, now abandoned.

(51) Int. Cl.$^7$ .......................... C08L 75/04; C08G 18/30; C07C 271/08; C07C 271/06
(52) U.S. Cl. .................. 525/458; 252/182.24; 524/198; 525/399; 525/453; 525/456; 525/457; 528/28; 528/45; 528/49; 528/60; 528/65; 528/70; 528/71; 528/73; 528/85; 560/25; 560/26; 560/115; 560/158
(58) Field of Search .................. 252/182.24; 524/198; 525/399, 453, 456, 457, 458; 528/28, 45, 49, 60, 65, 70, 71, 73, 85; 560/26, 115, 158, 25

(56) References Cited

U.S. PATENT DOCUMENTS

| | | | |
|---|---|---|---|
| 2,873,266 A | 2/1959 | Venkataramaraj | 528/85 |
| 3,248,373 A | 4/1966 | Barringer | 528/65 |
| 3,576,777 A | 4/1971 | Neumann et al. | 528/45 |
| 3,884,713 A | 5/1975 | Langley et al. | 106/308 N |
| 3,917,570 A | 11/1975 | Chang et al. | 528/73 |
| 3,962,369 A | 6/1976 | Chang et al. | 525/518 |
| 4,007,151 A | 2/1977 | Ogawa et al. | 524/875 |
| 4,018,849 A | 4/1977 | Chang et al. | 525/520 |
| 4,268,684 A | 5/1981 | Gurgiolo | 560/24 |
| 4,284,750 A | 8/1981 | Amirsakis | 528/79 |
| 4,288,577 A | 9/1981 | McShane, Jr. | 525/453 |
| 4,394,491 A | 7/1983 | Hoffman | 525/452 |
| 4,484,994 A | 11/1984 | Jacobs, III et al. | 204/501 |
| 4,485,228 A | 11/1984 | Chang et al. | 528/84 |
| 4,520,167 A | 5/1985 | Blank et al. | 525/131 |
| 4,524,192 A | 6/1985 | Alexander et al. | 525/440 |
| 4,530,976 A | 7/1985 | Kordomenos et al. | 525/440 |
| 4,533,703 A | 8/1985 | Kordomenos et al. | 525/440 |
| 4,533,704 A | 8/1985 | Alexander et al. | 525/440 |
| 4,540,766 A | 9/1985 | Chang et al. | 528/45 |
| 4,540,771 A | 9/1985 | Ambrose et al. | 528/272 |
| 4,543,405 A | 9/1985 | Ambrose et al. | 528/78 |
| 4,548,998 A | 10/1985 | Chang et al. | 525/441 |
| 4,560,494 A | 12/1985 | Druetzler | 252/182 |
| 4,605,724 A | 8/1986 | Ambrose et al. | 528/73 |
| 4,619,955 A | 10/1986 | Druetzler | 524/29 |
| 4,631,320 A | 12/1986 | Parekh et al. | 525/452 |
| 4,795,796 A | 1/1989 | Haubennestel et al. | 528/28 |
| 5,130,405 A | 7/1992 | Walker et al. | 528/78 |
| 5,155,201 A | 10/1992 | Gardon et al. | 528/78 |
| 5,175,227 A | 12/1992 | Gardon et al. | 528/45 |
| 5,221,788 A | 6/1993 | Goto et al. | 528/85 |
| 5,372,883 A | 12/1994 | Shores | 428/323 |
| 5,491,029 A | 2/1996 | Evans et al. | 428/423.1 |
| 6,624,277 B2 * | 9/2003 | Yahkind et al. | 528/45 |

FOREIGN PATENT DOCUMENTS

| | | |
|---|---|---|
| CA | 2 106 688 | 9/1992 |
| DE | 3 018 715 | 11/1981 |
| EP | 0 001 304 | 4/1979 |
| EP | 0 257 848 | 3/1988 |
| EP | 0 409 301 | 1/1991 |
| EP | 0 530 806 | 3/1993 |
| EP | 0 537 900 | 4/1993 |
| GB | 1 113 925 | 5/1968 |
| GB | 1196573 | 7/1970 |
| GB | 1 479 530 | 7/1977 |
| GB | 1 520 940 | 8/1978 |
| JP | 59-006209 | 1/1984 |
| JP | 60 166 319 | 8/1985 |
| JP | 2 292 318 | 12/1990 |
| JP | 04 117 418 | 4/1992 |
| JP | 05 043 644 | 2/1993 |

OTHER PUBLICATIONS

H.P. Higginbottom, G.R. Bowers, P.E. Ferrell, & L.W. Hill—Solutia Inc. "Cure of Secondary Carbamate Groups by Melamine–Formaldehyde Resins," vol. 71, No. 894, Jul. 1999, pp. 49–60.

* cited by examiner

Primary Examiner—Rabon Sergent
(74) Attorney, Agent, or Firm—Joan M. McGillycuddy; David H. Vickrey

(57) ABSTRACT

The present invention relates to a film forming composition, a method of forming the composition, and application of the composition to coating formulations which provide a cured coating having acid rain resistance. A film-forming polyurethane polyol composition comprises a reaction product of an n-functional isocyanate (wherein n is a number ranging from about 2 to about 5) with at least one diol or triol or mixtures thereof and a compound containing isocyanate-reactive functional groups, preferably a monofunctional alcohol or thiol. The low viscosity polyurethane polyol of the present invention is typically crosslinked/cured using a melamine to produce a cured coating which is highly acid etch resistant as well as having other desirable physical-mechanical properties. The coating compositions have improved flow characteristics compared to compositions containing polyurethane polyols prepared without the monofunctional alcohols or thiols. The invention also relates to mixtures of nonfunctional polyurethanes with polyurethane polyols.

14 Claims, No Drawings

POLYURETHANE POLYOLS AND COATINGS THEREOF HAVING REDUCED VISCOSITY

CROSS REFERENCE TO RELATED APPLICATION

This application is a continuation in part of U.S. Ser. No. 08/483,134 filed Jun. 7,1995 now abandoned.

BACKGROUND OF THE INVENTION

1. Field of the Invention

The present invention relates to the use of a particular class of oligomeric polyols to form high solids coatings having reduced viscosity as well as resistance to environmental factors such as acid rain and ultraviolet light. Polyurethane polyols are prepared by reacting a polyisocyanate with both a compound having a single functional group reactive with isocyanate, such as a monofunctional alcohol or monofunctional thiol, and with a diol or triol which reacts substantially only-single-endedly with an isocyanate. Mixtures of nonfunctional polyurethanes and polyurethane polyols are also taught.

2. Background of the Invention

Many of the high-performance automotive high-solids coatings presently in use are based on polymeric systems containing polyester or acrylic polyols. In typical single-component coatings, wherein all of the coating ingredients are combined into one storage stable mixture, the polyester or acrylic-polyol component is typically crosslinked with melamine (aminoplast resin) under heat cure conditions of about 250 degrees F. or above to provide a thermally cured coating. In typical two-component systems, such polyols are combined with a suitable isocyanate shortly before application to the surface to be coated and the combination is cured at temperatures ranging from about 70 degrees F. to about 280 degrees F.

Currently, the automotive industry is using basecoat/clearcoat coatings in ever increasing amounts. In such systems, a pigmented coating is applied over appropriate primers and the coating system is completed by applying an unpigmented clear topcoat over. the pigmented basecoat. It is also desirable that such coating systems comply with VOC regulations, which typically require that the clearcoat have volume solids in excess of 50 percent (for a high solids type). Simultaneously, due to the deterioration of our environment, the automotive industry has been searching for coatings systems which, after curing/drying, are acid rain resistant.

To obtain high solids while maintaining acceptable coating formulation viscosity for spray application, the industry has tended to decrease the number average molecular weight (Mn) of the film forming polymers and to increase the amount of crosslinker, thereby obtaining a cured coating having adequate hardness, gloss, impact strength, appearance and exterior durability. Typical coating formulations use a melamine or other amino resin as the crosslinker. Increased amounts of monomeric melamine crosslinkers reduce the formulation viscosity. As the amount of amino resin is increased, the acid rain resistance of these coatings is compromised. At this time the automobile manufacturers consider improved resistance of automotive finish coatings to environmental etching (acid rain) to be a high priority. It is believed that ester bonds in an acrylic melamine or polyester melamine coating are weak points in the crosslinked resin network, susceptible to acid catalyzed hydrolysis.

Current high solids automotive topcoats, whether they be monocoats or the more modern basecoat/clearcoats, are predominantly oligomeric acrylic polyols crosslinked with melamine-formaldehyde resins. Modern topcoats of this type form visually appealing, high gloss films and are designed to retain high levels of gloss after extensive accelerated weathering and Florida exposure. In recent years, further improvement in durability has been obtained by the use of basecoat/clearcoat systems, where the clearcoat acts as a screen to protect the pigmented film.

There has been a general reduction in the pH, and an increase in the concentration of electrolytes, in rain water, creating "acid rain". Probably as a result of the combination of these factors, a new problem has evolved in automotive topcoat technology which is generally referred to as acid or environmental etching. The defect appears as a grainy water spot pattern seen predominantly on horizontal surfaces. An in depth study of the problem by General Motors workers indicates that acidic components in a wetting event (dew or rainfall) react with calcium, a common constituent of dirt. As droplets evaporate, calcium sulfate precipitate forms on horizontal surfaces around the droplet perimeters. Subsequent washing removes the precipitate, but scars remain. It is generally observed that the problem is most conspicuous on dark, freshly painted surfaces in warmer and more polluted environments. The normal crosslinking at the surface of a coating induced by exposure to UV radiation and oxygen may eventually protect the film. Thus, the problem is largely one that occurs on automobile dealers' lots. Frequently, etched cars must be repainted before they can be sold. One major U.S. manufacturer estimates the cost of environmental etching to exceed 50 million per year.

A considerable amount of work has been done related to coatings containing polyurethane polyols. One way to make polyurethane polyols is to react a diisocyanate or a multifunctional isocyanate with a significant stoichiometric excess of a diol. After the reaction is complete, the excess of diol is removed, preferably by distillation. The obvious disadvantage of this method of making low molecular weight polyurethane polyols is that the distillation of the diols is inconvenient and it is not possible to use diols of high molecular weight (which cannot be distilled off) unless they are later recrystallized. Also, molecular weight control is difficult in such processes because even at the stoichiometric excess, a limited number of hydroxyl groups on the same diol molecules will react with the isocyanate, giving chain extensions beyond the intended low molecular weight polymers. This results in broad molecular weight distributions. U.S. Patents describing the production of polyurethane polyols by using stoichiometric excess of diols include: U.S. Pat. No. 4,543,405 to Ambrose, et al.; issued Sep. 24, 1985; and U.S. Pat. No. 4,288,577 to McShane, Jr., issued Sep. 8, 1981.

Crosslinked coatings based on polyurethane polyols of this type have been described in U.S. Pat. Nos. 4,548,998 to Chang, et al., issued Oct. 22, 1985; 4,540,766 to Chang et al., issued Sep. 10, 1985; and 4,485,228 to Chang et al., issued Nov. 27, 1984. The coatings based on these compositions offer good flexibility and hardness balance.

Another class of similar coating polymeric systems is based on urethane-modified polyesters. The polymeric systems are prepared by reacting a polyisocyanate with an excess of diol and then using this resulting mixture as a polyol reactant for carrying out a conventional polyester condensation involving acids, diols, triols and so on. Alternatively, hydroxyl terminated conventional polyesters can be extended with isocyanates.

Typical U.S. patents describing such polymeric systems include: U.S. Pat. No. 4,605,724 to Ambrose et al., issued Aug. 12, 1986; U.S. Pat. No. 4,540,771 to Ambrose et al., issued Sep. 10, 1985; U.S. Pat. No. 4,530,976 to Kordomenos et al., issued Jul. 23, 1985; U.S. Pat. No. 4,533,703 to Kordomenos et al., issued Aug. 6, 1985; U.S. Pat. No. 4,524,192 to Alexander et al., issued Jun. 18, 1985; and U.S. Pat. No. 4,533,704 to Alexander et al., issued Aug. 6, 1985. These patents describe methods of making the polymers and their use in coatings.

Japanese Patent 82-JP-115024, assigned to ASAHI Chemical IND KK, discloses a method of preparing an isocyanate terminated prepolymer wherein the isocyanate termination groups have different reactivity. The isocyanate terminated prepolymer is prepared by reacting two types of polyisocyanate having different reactivities with diols having two kinds of hydroxyl groups of different reactivity. The resulting prepolymer is subsequently crosslinked/cured using moisture or another source of hydroxyl groups.

U.S. Pat. No. 3,576,777 discloses the use of polyurethanes prepared from organic diisocyanates and glycols in conjunction with unsaturated oil-modified alkyd resins for preparing thixotropic paints. Small quantities of monoisocyanates and monoalcohols can optionally be concurrently used with these reactants. Since the polyurethanes are described as retaining their thixotropic properties, they are believed to have relatively broad molecular weight distributions.

European Patent EP 0 001 304 of Akzo N.V. discloses coating compositions comprising physical blends in organic solvents of polyhydroxy compounds, and polyisocyanates and tertiary alcohols which have prolonged pot life but rapid curing when applied.

U.S. Pat. No. 2,873,266 discloses polyurethane prepared by reacting mixtures of primary and secondary glycols, each containing at least 4 carbon atoms between the hydroxyl groups with a aliphatic diiso compound containing two groups of the formula —N=C=X separated by at least 4 carbon atoms, where X is oxygen or sulfur.

U.S. Pat. No. 4,619,955 discloses isocyanate functional urethanes useful as flexibilizing additives for polymeric vehicles, comprising reaction products of (a) aliphatic polyisocyanates, (b) at least one monofunctional alcohol containing an ether or carboxyl oxygen and (c) at least one diol.

U.S. Pat. No. 4,631,320 discloses thermosettable coating compositions comprising hydroxy group-containing polyurethanes, amino cross-linkers and optional catalysts and/or solvent. The hydroxypolyurethanes can be prepared by either self-condensing certain polyhydroxyalkyl carbonate compounds or by condensing same with polyols.

U.S. Pat. No. 5,155,201 of Akzo N.V. discloses polyurethane polyols comprising reaction products of n-functional polyisocyanates (n=2–5) and substantially monomeric diols having hydroxyl groups separated by 3 carbon atoms or less, and is incorporated herein by reference.

U.S. Pat. No. 5,175,227 of Akzo N.V. discloses acid etch resistant coating compositions comprising polyurethane polyols and hydroxyl group-reactive crosslinkers. The polyurethane polyols comprise reaction products of substantially monomeric asymmetric diols with hydroxyl groups separated by 3 carbon atoms or less and n-functional polyisocyanates (n=2–5). This patent is incorporated herein by reference.

Additionally, U.S. Pat. No. 5,130,405 of Akzo N.V. discloses acid etch resistant coatings comprising (1) polyurethane polyols prepared from symmetric 1,3-diol components and polyisocyanates and (2) hydroxyl group-reactive crosslinking agents, and is incorporated herein by reference.

Using any given multifunctional isocyanate starting material, none of the references cited above discloses a composition or process for making a composition having a controlled molecular weight which permits high solid coatings with exceptionally low application viscosity, of the kind possible using the present invention, without resorting to the employment of large molar excesses of diol components.

The preparation of polyurethane polyols is also possible without using isocyanate reactants. The preparation involves the reaction of an amine with a cyclic carbonate, leading to a urethane with a hydroxyl group in a beta position to the urethane group. For example, the reaction of a diamine with two moles of ethylene or propylene carbonate will lead to a polyurethane diol. Various embodiments of this method of producing polyurethane polyols are found in the following patents: U.S. Pat. No. 3,248,373 to Barringer, issued Apr. 26, 1966; European Patent 0257848 to Blank, published Mar. 2, 1988; U.S. Pat. No. 4,631,320 to Parekh, et al., issued Dec. 23, 1986; U.S. Pat. No. 4,520,167 to Blank et al., issued May 28, 1985; U.S. Pat. No. 4,484,994 to Jacobs III et al., issued Nov. 27, 1984; U.S. Pat. No. 4,268,684 to Gurgiolo, issued May 9, 1981; and U.S. Pat. No. 4,284,750 to Ambirsakis, issued Aug. 18, 1981. Most of the patents listed directly above describe the use of such polyurethane polyols in crosslinked coatings. The polymer systems comprising these coatings do not provide exceptional chemical resistance nor acid-rain resistance.

European patent application 0 530 806 Al (Mitsubishi Kasei) discloses linear polyurethane polyols obtained by the reaction of various hydrocarbon idiols (having from 7 to 20 carbon atoms) with isophorone diisocyanate, reportedly having Mn from 500 to 20,000. Since both reactants are difunctional, the final molecular weight and viscosity should be predominantly determined by the OH/NCO ratio and the non-symmetric nature of the diisocyante. No modifications with monofunctional reactants are disclosed.

European patent application 0 537 900 A2 (Rohm & Haas) disclosed thickening agents for non-aqueous solvent-containing compositions, based upon reaction products of polyols containing at least two hydroxyl groups with polyisocyanates containing at least two isocyanato groups and an active hydrogen compound. The active hydrogen compound can contain hydroxyl groups or primary or secondary amino groups. The reaction of isocyanates with amines to form urea compounds for rheology control (i.e., thickening) is a well-known technique which teaches away from the present invention.

An Abstract of JP 0 5,043,644A discloses polyurethane resins prepared by reacting glycols (A) with polyisocyanates (B) in the presence of monofunctional active hydrogen compounds (C) (such as monothioalcohols), then reacting the urethane prepolymers obtained (D) with chain extenders (E) to obtain polyurethane resins of very high molecular weight (Mn >200,000). The use of $\alpha,\beta$-diols and $\alpha,\gamma$-diols is not disclosed.

An Abstract of JP 0 4,117,418A (Hitachi) discloses the preparation of urethane resins in the presence of acrylic monomers to reduce solvent emissions from coatings containing same. The resins contain (A) copolymers containing hydroxyl group-containing ethylenically unsaturated monomers as comonomers, (B) polyisocyanates and (C) reactive diluents consisting of 100–60 wt % of a polyhydric alcohol and 0–40 wt % of a monohydric alcohol. GB 1,520,940 refers to the preparation of hydroxy-free polyurethanes and pigment dispersions containing the same. Examples 1A, 6A and 8A refer to NCO/OH ratios of about 0.976.

Recently it has become increasingly important, for environmental compliance, to develop polymeric systems with low solution viscosities, which permit formulation of high solids coatings with low application viscosities. High solids (greater than about 50 weight percent solids) coatings decrease the amount of volatile organic compounds (VOC) which pass into the ambient atmosphere upon drying/curing of the coating.

To achieve acceptable solution viscosities (20–30 seconds, #4 Ford Cup at about 25 degrees C.) for typical high solids coating systems, it is necessary that the film-forming polymer have a weight average molecular weight (Mw) lower than about 5,000. To achieve good film properties in such systems after crosslinking, it is also necessary that the number average molecular weight (Mn) should exceed about 800, and that each number average molecule should contain at least two reactive hydroxyl groups. These general principles apply to polyester polyols, acrylic polyols, and also to urethane polyols when crosslinked with melamine resins or with isocyanates. As is evident from the above discussion, the requirements for acceptable solution viscosities and good film properties lead to contradictory molecular weight requirements—for low solution viscosities the Mw should be low, but for good film properties the Mn should be high.

Currently used high solids one-component clearcoats are based on low molecular weight acrylic polyols and melamines, typically hexamethoxymethyl melamine. Acid rain resistant and high solids coating systems have been achieved using two component systems such as the polyol-isocyanate systems previously discussed. These coating systems can be used at an overall weight percent solids of greater than about 50 percent. However, the presence of reactive isocyanate groups necessitates the use of a two-component system which must be mixed shortly before use. The two component systems require additional handling and storage operations as well as provide a source of error in relative quantity of ingredients used. Errors in mixing can adversely affect the quality of the finished coating. The use of reactive isocyanate crosslinkers requires the use of special safety equipment to avoid toxic effects resulting from human exposure to isocyanate. Unfortunately this technology is substantially more expensive than current one component coatings, both in terms of raw material cost and the expense involved in retrofitting an existing automotive assembly line to handle two component coatings. Thus, it would be advantageous to have a single component isocyanate-free system which can be applied at a high weight percent solids and which exhibits acid rain resistance.

SUMMARY OF THE INVENTION

In accordance with the present invention, a polyurethane polyol composition useful as a film-forming material comprises the reaction product of:

(a) about one NCO equivalent of an n-functional isocyanate compound, wherein n is a number ranging from 2 to about 5;

(b) x moles of at least one component diol or triol or mixtures thereof, selected from substantially monomeric species wherein the hydroxyl groups are separated by 2 or 3 carbon atoms; and (c) y moles of a compound containing from 1 to 18 carbon atoms and a single functional group capable of reacting with an isocyanate, wherein the sum of x+y is about 0.6 to 1.4 and y= about 0.01x to about 75x, provided that the NCO/OH equivalent ratio does not exceed unity.

More preferably, the NCO/OH equivalent ratio is less than 0.976.

These ingredients are preferably combined in a sequence that produces reaction products having low polydispersity, e.g. Mw/Mn $\leq 3$, or preferably $\leq 2.5$, or most preferably $\leq 2$.

The compounds, of (c) can be selected from a group of single active hydrogen-containing compounds containing from 1 to 18 carbon atoms. As stated in U.S. Pat. No. 4,394,491, such compounds can be described as "monoahls", i.e. organic compounds containing single hydrogen moieties capable of reacting with the isocyanate moieties of unsaturated isocyanates via a urethane reaction. This patent is incorporated herein by reference. This class includes monoalcohols and thiols, primary and secondary amines and heterocyclic nitrogen compounds containing an active hydrogen attached to a nitrogen atom within the ring. The monoalcohols and thiols are presently preferred. Some of these compounds can be represented by the formulas R—OH, R—SH, R—NH$_2$, R$^1$—NH—R$^2$ and (CH$_2$)$_z$—NH, where R is a hydrocarbyl group having 18 carbon atoms or less and can be an alkyl, alkenyl, aryl, alkaryl group or the like, and R$^1$ and R$^2$ are selected from the same family of groups, with the sum of the carbon atoms in R$^1$ and R$^2$ being 18 or less. The nitrogen-containing heterocyclic rings can contain from 4 to about 7 members selected from carbon atoms, nitrogen atoms and other compatible atoms such as sulfur and oxygen. Preferably, the ring contains only nitrogen and from 4 to about 6 carbon atoms, i.e., z=4 to 6 in the formula.

It should be noted that, as used herein, the term "polyurethane polyol" refers to a reaction product wherein the principal reactants (diol component and polyisocyanate component) are linked substantially only via urethane linkages. This is in contrast, for example, to the aforementioned polyesterurethane and urethane-modified polyester polyols, in which the reactants are linked via urethane as well as ester linkages. Furthermore, these products include hydroxyl groups as their principal functional groups.

Optionally, the monofunctional alcohols, thiols, or other active hydrogen compounds (c) can contain additional polar groups which are substantially nonreactive with the isocyanate groups of the n-functional polyisocyanates (a), or at least less reactive than the isocyanate-reactive functional groups under typical reaction conditions, as described later and in the examples. Such groups can include nitro groups, carboxylate groups, urea groups, fluoro groups, silicon-containing groups and the like. The presence of such functional groups in alcohols/thiols (c), and thus in the finished polyurethane polyol, is believed to make such resins better pigment dispersants and also to improve the adhesion to certain substrates of the coating compositions containing same.

Further in accordance with the invention, the polyurethane polyols can be reacted with a suitable diisocyanate to form an adduct having a molar ratio of isocyanate:OH equivalents of no more than about 0.5:1. Such adducts can be used in coating compositions in the same manner as the polyurethane polyols themselves.

Further in accordance with the invention, the n-functional isocyanate (a) is reacted with the diol or triol or mixture thereof (b) and said isocyanate—reactive compound (c) in a manner such that substantially all of the isocyanate groups of said n-functional isocyanate (a) are reacted with one hydroxyl group on said diol or triol molecules or with said isocyanate-reactive compound (c), whereby the less reactive hydroxyl groups on said diol or triol remain substantially unreacted.

Further in accordance with the invention, the above coating film-forming materials can be used in combination with compounds. having crosslinking functional groups and (optionally) with catalysts to provide a high solids coating material which is cured and dried to a film having excellent weathering characteristics, including acid rain resistance and non-yellowing behavior relative to other known film-forming materials. In accordance with one: embodiment of the invention, a high solids, thermosetting coating composition comprises from about 20 to about 80 weight percent of a polyurethane polyol as described above, optionally up to about 80 weight percent of another polyol selected from the group consisting of polyester polyols, polyacrylate-polyols and alkyd polyols and from about 10 to about 50 weight percent of an at least partially alkylated melamine resin which acts as a crosslinker for the other components, all weight percentages being based on total vehicle solids.

While the composition of the present invention is particularly useful in automotive coatings, it can also be used for other transportation industry coatings, with plastics and for general industrial and decorative applications. The process of the present invention allows exceptionally good molecular weight control of the polyurethane polyol, which permits the formulation of high solids coatings with exceptionally low application viscosity. An unexpected beneficial feature of polyurethane polyols produced using this particular class of polyols is that for automotive coatings they provide good acid rain resistance when cured with melamine in a one-component coating. Other outstanding features of polyurethane polyols of the present invention are that they can be used to produce coatings having good UV durability, good chemical resistance, and other properties desirable not only for the automotive industry, but potentially for other applications such as appliances, metal furniture and business machines, for example.

As also indicated above, the diol component is selected from substantially monomeric diols wherein the hydroxyl groups are separated by 2 or 3 carbon atoms. The diol component may comprise a single such monomeric diol or combinations thereof.

For the purposes of the present description, this class of diols can be divided into two groups: (i) asymmetric diols —possessing hydroxyl groups of a different order, for example, one primary and one secondary hydroxyl group, and (ii) symmetric diols, in which both hydroxyl groups are of the same order, preferably primary.

Suitable triols can be used as additions or alternatives to the dials described above, as discussed below, but are generally not preferred because they lead to products of higher viscosity.

The n-functional isocyanate is substantially monomeric and is at least difunctional, with a functionality of 3 to 4 being most preferred. The isocyanate can be an isocyanurate of a monomeric diisocyanate; for example, the isocyanurate of 1,6-hexamethylenediisocyanate. The isocyanate can also be a biuret of a monomeric isocyanate; for example, a biuret of 1,6-hexamethylenediisocyanate. In addition, the isocyanate can be the reaction product of a diisocyanate and a polyhydroxy compound, such as the product of meta-tetramethylxylelenediisocyanate with trimethyolpropane. In the present invention, isocyanurates are preferred. The amount of isocyanate is chosen so that the ratio of the number of isocyanate equivalents to the number of moles of the monofunctional alcohol (or other isocyanate-reactive compound) and the diol or triol molecules is in the range of 1: about 0.6 to about 1.4, preferably from 0.9 to 1.1. Typically the Mw/Mn of the reaction product ranges from about 1.1 to about 2.5 or about 3, wherein Mn ranges from about 300 to about 3,000, with the most preferred Mn being less than about 2,500.

Coatings comprising the above-described polyurethane polyol film-forming composition can be clear coatings wherein the overall coating weight percent solids ranges from about 40 percent to about 80 percent, and wherein the coating material (film-forming composition in a suitable solvent system) viscosity over the above solids range is from about 25 cps to about 300 cps at 25 degrees C.

The polyurethane polyol film-forming compositions of the present invention can also be used in pigmented paint or coating formulations. The overall coating weight percent solids ranges from about 40 percent to about 80 percent wherein the coating material viscosity over the above solids range is from about 25 cps to about 300 cps at about 25 degrees C. It has been found that single layer pigmented coatings made using the composition have a lower tendency to yellow when overbaked upon curing than do conventional acrylic and polyester enamels.

The use of the monofunctional alcohols/thiols or other compounds of (c) in place of a portion of the diol/triol component (b) results in polyurethane polyols having lover hydroxyl functionality than those prepared with the diols/triols alone. Such polyurethane polyols, as described in U. S. Pat. Nos. 5,155,201; 5,130,405 and 5,175,227, all assigned to Applicants' Assignee, have been found to produce coating compositions which cure to films having many advantageous features, including acid etch resistance. Surprisingly, the coating compositions of the present invention which incorporate polyurethane polyols having lower hydroxyl functionality have been found to have equivalent acid etch resistance and reduced viscosity. The combination of acceptable acid etch resistance (of cured films) with:reduced viscosities (of the polyurethane polyols and coatings containing same) is advantageous, since it permits the formulation of coatings compositions having higher solids contents which have the lower volatile organic contents (VOC) increasingly demanded by the marketplace.

To reduce the viscosity of such coating compositions while retaining similar acid etch resistance in the cured coatings (compared with products of these previous patents) is considered surprising and unexpected because the substitution of monofunctional species for diols reduces the hydroxyl content in the resulting resin, and thus the crosslink density of the network formed when the polyurethane polyol is cured with melamine. A polymer chemist would normally expect such effects to diminish chemical resistance properties of the cured coatings, which are normally enhanced by increasing crosslink density.

The invention also relates to mixtures of nonfunctional polyurethanes and polyurethane polyols.

DETAILED DESCRIPTION OF THE INVENTION

The Polyurethane-polyol Compositions

The polyurethane-polyol composition of the present invention can be synthesized using either isocyanates or polyisocyanates. The isocyanates are n-functional, wherein n is a number ranging from 2 to about 5, with a functionality of 2 to 4 being preferred, and a functionality of about 3 to 4 being most preferred. Due to variations in the preparation of such isocyanates, the n-values may be either integral or have intermediate values in the numerical ranges indicated. Preferred isocyanates are either biurets or isocyanurates of hexamethylenediisocyanate. Isocyanurates are typically obtained by cyclotrimerization of three moles of a diisocyanate. Biurets are typically obtained by the reaction of three moles of diisocyanate per mole of water.

The more preferred polyurethane-polyol compositions have a number average molecular weight (Mn) ranging from about 300 to about 3,000, with the ratio of weight average molecular weight (Mw) to number average molecular weight ranging from about 1.1 to about 3. Preferably, this ratio (polydispersity index) ranges from about 1.1. to about 2.5, and most preferably from about 1.1 to about 2.

Examples of isocyanates which can be used to synthesize the composition of the present invention include:

DIISOCYANATES such as 1,6-hexamethylenediisocyanate, available for example, as HMDI from Miles, formerly Mobay Chemical Corp.;

isophorone diisocyanate, available as IPDI from, for example, Huls America Inc.;

tetramethylxylylene diisocyanate, available for example, as TMXDI(meta) from Cytek;

2-methyl-1,5-pentane diisocyanate; 2,2,4-trimethyl-1,6-hexamethylene diisocyanate; 1,12-dodecane diisocyanate and methylene bis(4-cyclohexyl isocyanate) available for example, as Desmodur W from Miles; and POLYISOCYANATES such as the biuret of HMDI, available for example, as Desmodur N from Miles; the isocyanurate of HMDI, available for example, as Desmodur N-3390 from Miles; the isocyanurate of IPDI, available for example, as Desmodur Z-4370 from Miles.; and the triisocyanate product of m-TMXDI and trimethylolpropane, available for example, as Cythane 3160 from Cytek.

The isocyanurates and biurets of each diisocyanate listed above can also be used to synthesize the compositions of the present invention. There are numerous n-functional isocyanates commercially available which can be used in the present invention, as indicated above.

Preferred asymmetric diols are those having from 3 to 18, more preferably 4 to 18, and especially 5 to 12 carbon atoms. Examples of such asymmetric diols include: 2-ethyl-1,3-hexane-diol (EHDO), available, for example, from Union Carbide Corp.; 1,2-propanediol; 1,3-butanediol; 2,2,4-trimethyl-1,3-pentanediol, available for example, from Eastman Chemical Products, Inc.; and 1,12-octadecanediol, as well as 1,2-hexanediol, 1,2-octanediol and 1,2-decanediol. Preferred of these are 2-ethyl-1,3-hexanediol, 1,2-hexanediol, 1,2-octanediol, 1,2-decanediol and 2,2,4-trimethyl-1,3-pentanediol. Such asymmetric diols can be classified as 1,2-($\alpha,\beta$) and 1,3-($\alpha,\gamma$) diols. When such diols are reacted with the isocyanates under conditions favoring the reaction of substantially all available isocyanate groups with the more active hydroxyl groups of the diols, the remaining hydroxyl groups on the diols (or triols) will become sterically hindered toward further reactions.

If the synthesis temperature is higher than desired, the reactivity of the second hydroxyl group on the (former) diol molecule that has already reacted once with isocyanate increases relative to the hydroxyl groups on the unreacted diol. When this happens, the selectivity of the reaction between the isocyanate functional groups and the preferred hydroxyl group is reduced. The Mw/Mn ratio of the polyurethane-polyol compound is thereby detrimentally increased. Thus, in the method of synthesis of the polyurethane polyols of the present invention using asymmetric diols, the synthesis reaction temperature is typically controlled between about 15 degrees C and about 120 degrees C.

Preferred symmetric diols include those having from 2 to 18, 5 more preferably 5 to 18 carbon atoms, and especially 5 to 12 carbon atoms. Specific examples include ethylene glycol, neopentyl glycol, 2,3-butanediol, 2,4-pentanediol, 1,3-propanediol, 2,2-diethyl-1,3-propanediol and 2-butyl-2-ethyl-1,3-propanediol. Preferred of these are neopentyl glycol, 2,3-butanediol, 2,2-diethyl-1,3-propanediol and 2-ethyl-2-butyl-1,3-propanediol.

Suitable triols having from 3 to about 18 carbon atoms can be used as alternatives to or in addition to the diols described above. The hydrocarbyl groups to which the hydroxyl groups are attached can be alkyl, alkenyl or alkaryl, with either symmetric or asymmetric molecular structure and arrangement of the hydroxyl groups (i.e., primary or secondary). Typical triols which are suitable include 2-ethyl-(2-hydroxymethyl)-1,3-propanediol, glycerol and 1,1,1-tris(hydroxymethyl)ethane.

The monofunctional compounds used as component (c) in synthesizing the polyurethane polyols can preferably be selected from alcohols and thiols having 18 carbon atoms or less. Such compounds can be represented by the formulas R—OH and R—SH, where R is a hydrocarbyl group having 18 carbon atoms or less and can be an alkyl, aklenyl, alkaryl group or the like. The R group can be linear or branched, cyclic or acyclic, and the alcohols and thiols can thus be primary, secondary or tertiary. The species presently preferred are the linear primary alcohols and thiols, with the most preferred being the short chain aliphatic species having from 2 to about 12 carbon atoms.

It is generally preferred that the components should be reacted at a temperature of about 125 degrees C. or less, referably ranging from about 15 degrees C. to about 125 degrees C. If the reaction temperature is too high or too low, the molecular weight properties of the resulting polyurethane polyols may be undesirably compromised. Low temperature effects may be due to solubility effects, and are thus dependent upon the solvent(s) optionally employed. The time period can range from about 30 minutes to about 24 hours.

As mentioned above, the components may optionally be reacted in the presence of a polyurethane catalyst. Suitable polyurethane catalysts are conventional and may be utilized in conventional amounts. Of course, the particular choice of catalyst type and amount will be dictated based upon a number of factors such as the particular components and reaction conditions. These and other factors are well-known to those skilled in the art, who can make the proper choices accordingly. Presently preferred catalysts include tin and tertiary amine-containing compounds, such as organometallic tin compounds and tertiary alkylamines.

The principal reactants can be combined in any suitable sequence which produces reaction products having low polydispersity, some variations of which will produce preferred versions of the polyurethane polyols. For example, (i) the monofunctional isocyanate-reactive component (c) can be reacted with the n-functional isocyanate (a) and then the resulting intermediate can be reacted with the diol or triol component (b). (This is designated "Method 1".) Alternatively, (ii) the n-functional isocyanate (a) can be reacted with a mixture of the diol component (b) and the monofunctional component (c), preferably in the presence of a catalyst. (This is designated "Method 2".) Additionally, (iii) a portion of n-functional isocyanate (a) can be reacted with the monofunctional isocyanate-reactive component (c), the resulting intermediate can then be mixed with the remainder of the n-functional isocyanate (a) and the mixture reacted with the diol or triol component (b). (This is designated "Method 3".)

As is common in the preparation of polyurethanes, a variety of reaction products can be formed in such reactions, depending upon the reactants, their proportions and the reaction sequences employed. For purposes of the present invention, it is desired to obtain substantially homogeneous products having low polydispersity, preferably lower than about 2. In some cases it is advantageous to utilize a small proportion of nonfunctional polyurethanes in conjunction with the polyurethane polyols, whether generated in situ or added from a separate source.

Generally the reaction products of the processes used to is prepare the polyurethane polyols will comprise species which can be represented by the following structure:

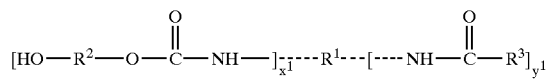

wherein $R^1$ is the portion of an n-functional polyisocyanate, with n ranging from 2 to about 5, from which the isocyanate groups have been abstracted;

$R^2$ is the portion of a substantially monomeric diol having 2 or 3 carbon atoms between the hydroxyl groups from which at least one hydroxyl group has been abstracted, $R^3$ is the portion of a monofunctional active hydrogen-containing, isocyanate group-reactive compound from which the active hydrogen has been abstracted, and $x'+y'$= from 2 to about 5.

Preferably the diols of $R^2$ are selected from α,β-diols and α,β-diols.

As stated above, a variety of reaction products can be formed in these reactions. For example, polyisocyanates which are at least difunctional can be joined together by diols which have reacted di-endedly. The degree to which that occurs depends upon the selectivity of the particular diols and isocyanates employed, and on the degree of functionality of the precursor isocyanates.

Further in accordance with the invention, the polyurethane polyols described above can be reacted with a diisocyanate to form an adduct, the diisocyanate being combined with the polyol in amounts such as to result in isocyanate:OH equivalents ratios of no more than about 0.5:1 in the adducts formed. Suitable diisocyanates include those described above for component (a).

Crosslinkers

Two melamine crosslinkers are illustrated in the examples below as useful with the polyurethane polyol compositions of the present invention to provide cured crosslinked coatings. There are numerous kinds of hydroxyl group-reactive crosslinkers which can be used with these polyurethane polyol compositions, such as polyisocyanates, blocked polyisocyanates and/or aminoplast resins. The blocking agents for the blocked polyisocyanate can be ketoximes, alcohols, phenolic compounds, malonic esters or acetoacetates. Presently preferred are the aminoplast resins, which generally speaking are aldehyde condensation products of melamine, urea, benzoguanamine or similar compounds. The most commonly used aldehyde is formaldehyde. These condensation products contain methylol or similar alkylol groups, and these alkylol groups are commonly at least partly etherified with an alcohol, such as methanol or butanol, to form alkylated ethers. The crosslinker resin can be substantially monomeric or polymeric depending on the desired final properties of the polyurethane-polyol cured coating. Monomeric melamine resins are preferred because they allow the formulation of coatings with higher solids contents. Polymeric melamines are useful in coatings where the use of a strong acid catalyst should be avoided.

Examples of readily available amino crosslinkers of the kind described above include: Hexamethoxymethylmelamine, such as Cymel 303, available from Cytek Industries, Inc.; mixed ether methoxy/butoxy methylmelamine, such as Cymel 1135, also available from Cytek; polymeric butoxy methylmelamine, such as M-281-M, available from Cook Composites and Polymers; and high imino polymeric methoxymethylmelamine, such as Cymel 325, available from Cytek. This list could include many other crosslinkers which differ by degree of polymerization, imino content, free methylol content, and ratios of alcohols used for etherification.

These aminoplast crosslinking agents can be utilized in widely varying weight ratios of polyurethane polyol to aminoplast, generally ranging from about 90:10 to 40:60, preferably from about 90:10 to 50:50.

Suitable isocyanate crosslinking agents include any of a number of those known for use in similar systems. Specific examples include the previously described n-functional isocyanates, especially the biuret and isocyanurate versions. Blocking of such isocyanates is well known to those skilled in the art and need not be detailed here.

As with the aminoplast crosslinking agents, the isocyanate crosslinking agents may also be utilized in widely varying amounts, but generally in an equivalents ratio of hydroxyl to isocyanate groups ranging from about 0.7 to about 2.2.

Crosslinking Catalyst

The crosslinking catalyst used in the examples below was a blocked dodecyl benzene sulfonic acid, such as Nacure 5226, available from King Industries. Other acid catalysts can be used as well. Acid catalysts are used to increase the rate of the crosslinking reaction in melamine-cured compositions. Generally, 0.1 to 5 percent by weight of the active catalyst is used, based on the coating formulation nonvolatile content. These acids may be blocked by a suitable compound, so that the catalyst is inactive until the coating is baked. Optionally, the catalyst may be used in an unblocked form, which may necessitate the formulation of a two-component coating. Since a single component coating is preferred for the reasons previously discussed, the work below was done using a blocked acid catalyst in a one component system. Examples of acids which may be used include phosphoric acid, alkyl acid phosphates, sulfonic acid and substituted sulfonic acids, and maleic acid or alkyl acid maleates. Examples of readily available catalysts include: para-toluenesulfonic acid (PTSA) such as Cycat 4040, available from Cytek; dodecylbenzene sulfonic acid (DDBSA) such as Bio-Soft 5-100, available from Stepan; phenyl acid phosphate (PAP); amine blocked DDBSA, such as Nacure 5226 and Nacure XP-158, available from King Industries; amine blocked PTSA, such as VP-451, available from Byk-Mallinckrodt; dinonylnaphthalene disulfonic acid (DNNDSA); and maleic acid.

This list could include numerous additional catalysts (blocked and unblocked) known to those skilled in the art. The type of catalyst used is determined by the desired bake schedule. Depending on the type of catalyst used, the bake conditions are typically from about 80 degrees C. to about 200 degrees C.

The clear coatings described herein can be modified to produce pigmented coatings or paints. The paint formulas frequently contain a number of additives for flow, surface tension adjustment, pigment wetting, or solvent popping.

Some typical additives follow: Flow aids such as A-620-A2 polybutylacrylate, available from Cook; Byk-320 silicone, available from Byk-Mallinckrodt; pigment wetting aids such as Disperbyk, available from Byk-Mallinckrodt; UV absorbers, such as Tinuvin 900 from Ciba; and hindered amine light stabilizers, such as Tinuvin 292 from Ciba. Other additives may also be used. The coatings can contain from 0 to 400 weight percent of suitable pigments and/or extenders based upon the combined weights of the polyurethane polyol and the crosslinker and from 0 to 15 weight percent additives for improvement of coating properties, based upon total solids content of the coating.

These coating compositions may be applied to any number of well known substrates by any of a number of conventional application methods. Curing of the coatings may be conducted under a variety of conditions, although curing of the above-described one-component systems is preferably carried out under baking conditions, typically from about 80 degrees C to about 200 degrees C.

The foregoing general discussion of the present invention will be further illustrated by the following specific but nonlimiting examples.

EXAMPLES

Synthesis of the Polyurethane Polyols

Comparative Examples I, II and III

For use as controls, polyurethane polyols based upon isocyanates and diols(only) without the monofunctional species of the invention, were prepared according to the methods of Example 1 of co-assigned U.S. Pat. No. 5,155,201 (previously incorporated by reference). Representative ingredients and properties of the polyols are shown in Table I below.

Examples IV and V are nonfunctional polyurethanes prepared by Method 2, with sufficient isocyanate employed to react with all available hydroxyl groups. As such, it is equivalent to complete replacement of the diol reactant by a monofunctional species such as an alcohol.

Coatings Formulated Using the Polyurethane-polyol Composition

TABLE I

Polyurethane Polyols Prepared with Monofunctional Alcohols

| Ex/Method | HDT LV | Des 3300 | EHDO | Mono-functional Alcohol | BEPD | % NV | Visc. 20 C. | Mn | Mw/Mn |
|---|---|---|---|---|---|---|---|---|---|
| I | | 1.0 eq | 1.0 m | | | 72.7 | 4470 | 1778 | 1.56 |
| II | 1.0 eq | | 1.0 m | | | 68.4 | 1330 | 1642 | 1.37 |
| III | | 1.0 eq | | | 1.0 m | 74.6 | 6100 | 1598 | 1.33 |
| IV | 1.0 eq | | | 1.00 m sBUT | | 75.1 | 1020 | 963 | 1.25 |
| V | | 1.0 eq | | 1.00 m sBUT | | 69.9 | 400 | 1093 | 1.32 |
| 1/1 | | 1.0 eq | 0.67 m | 0.33 m sBUT | | 69.4 | 940 | 1378 | 1.48 |
| 2/1 | | 1.0 eq | 0.60 m | 0.40 m sBUT | | 73.9 | 3025 | 1500 | 1.84 |
| 3/1 | | 1.0 eq | 0.50 m | 0.40 m sBUT | | 69.9 | 700 | 1390 | 1.47 |
| 4/1 | | 1.0 eq | 0.33 m | 0.67 m sBUT | | 70.9 | 580 | 1284 | 1.44 |
| 5/1 | | 1.0 eq | | 0.33 m sBUT | 0.67 m | 72.2 | 1040 | 1442 | 1.37 |
| 6/2 | | 1.0 eq | 0.73 m | 0.27 m EH | | 66.7 | 1360 | 1912 | 2.06 |
| 7/2 | 1.0 eq | | 0.65 m | 0.35 m OCDA | | 70.0 | N/A | 1926 | 1.62 |
| 8/2 | 1.0 eq | | 0.65 m | 0.35 m DDA | | 67.2 | 1500 | 1857 | 1.57 |
| 9/2 | 1.0 eq | | 0.73 m | 0.27 m DA | | 68.2 | 1440 | 2031 | 1.64 |
| 10/2 | | 1.0 eq | 0.80 m | 0.20 m DA | | 66.9 | 1600 | 2182 | 1.92 |
| 11/3 | | 1.0 eq | 0.67 m | 0.33 m sBUT | | 74.0 | 3085 | 1528 | 1.84 |

HDT LV = trimer containing isocyanurate ring of HMDI
EHDO = 2-ethyl,1,3-hexanediol
EH = 2-ethylhexanol
OCDA = octadecanol
sBUT = secondary butanol
BEPD = 2-butyl-2-ethyl,1,3-propanediol
Des 3300 = (Desmodur 3300) = isocyanurate of HMDI
DA = decyl alcohol
DDA = dodecanol
HMDI = hexamethylene diisocyanate

EXAMPLES 1 to 5

Method 1, monoalcohol reacted with NCO, then intermediate added to diol

In these examples, the monofunctional alcohol is added to all of the isocyanate component and the resulting intermediate is then added to the diol component for reaction. Representative reaction procedures are outlined below.

Example 1

Polyurethane polyol made by the reaction of secondary butanol and 2-ethyl-1,3-hexanediol (EHDO) with Desmodur 3300. (isocyanurate of hexamethylene diisocyanate)

| Reagent | Eq. Wt. | Grams | Eq's | Wt % |
|---|---|---|---|---|
| REAGENTS: | | | | |
| Kettle Charge (A) | | | | |
| sec. butanol | 74.12 | 146.0 | 1.97 | 5.409 |
| 10% DBTDL (in butyl acetate) | | 1.3 | | 0.048 |

-continued

| Reagent | Eq. Wt. | Grams | Eq's | Wt % |
|---|---|---|---|---|
| REAGENTS: | | | | |
| Feed—(B) | | | | |
| Des3300 | 194.0 | 1,158.2 | 5.97 | 42.907 |
| Methyl amylketone | | 809.2 | | 29.978 |
| Kettle Charge (C) | | | | |
| EHDO | 146.0 | 584.0 | 8.0 | 21.635 |
| 10% DBTDL (in Butyl acetate) | | 0.6 | | 0.022 |

DBTDL = Dibutyl tin dilaurate

Into a 5 L 4NRB flask fitted with a reflux condenser, mechanical stirrer, thermometer, monomer inlet adapter, and maintained under a nitrogen atmosphere, kettle charge (B) was placed. After heating the mixture 70 degrees C, feed (A) was added to 1.3 ml/min (2 hrs), maintaining the temperature at 70 degrees C. This mixture (AB) was held at 70 degrees C for 1.5 hr, cooled down to room temperature and transferred to 1 gallon can. Kettle charge (C) was placed in the original 5 L 4HRB (which prior to that was rinsed with solvent). After heating (C) to 70 degrees C., feed (AS) was added at 14.5 ml/min (2 hr). After completion of the feed addition, the temperature was held at 70 degrees C. for an additional 1.5 hr, after which the resin was cooled and transferred to a 1 gal container.

% Non-volatiles were measured on ca. 0.5 g samples, diluted with ca. 1.0 g MAK, stirred with a tared paper clip, and heated for 1 hr at 110 degrees C. Brookfield Viscosity was measured using a #4 spindle, 10 rpm, at 25 degrees C. Molecular weights are by GPC, using polyethylene glycol/polystyrene standards.

Characterization
% Non-volatiles: 70.0 (theory); 69.4 (measured)
Hydroxyl equivalent weight: 473
Viscosity: 940 mPa.s
Mn: 1378
Mw: 2035
Mw/Mn: 1.5

The remaining Examples 2 to 5 were prepared using similar reaction procedures. The proportions of reactants and results are shown in Table I.

Examples 6 to 10

Method 2, NCO added to mixture of diol and monoalcohol.

Example 6

Polyurethane polyol made by the reaction of secondary butanol and 2-ethyl-1,3-hexanediol (EHDO) with Desmodur 3300.

| Reagents | Molecular Weight | Equivalent Weight | Amount (g) | Equivalents/Moles | Weight % |
|---|---|---|---|---|---|
| A: Kettle Charge | | | | | |
| 2-ethyl-1-hexanol | 130.00 | 130.00 | 228.20 | 1.75 | 7.32% |
| 2-ethyl-1,3-hexanediol | 146.00 | 73.00 | 692.80 | 4.75 | 22.21% |
| 2-heptanone | | | 467.40 | | 14.99% |
| 10% DBTDL Solution in n-butyl acetate | | | 2.20 | | 0.07% |
| B: Isocyanate Feed | | | | | |
| Desmodur N-3300 isocyanurate | | 194.00 | 1261.00 | 6.50 | 40.43% |
| 2-heptanone | | | 467.40 | | 14.99% |
| | | | 3119.00 | | 100.00% |
| Characterization: | | | | | |
| % non-volatiles: Theoretical: | 70.00% | 70.00% | | | |
| Actual: | 67.00% | 67.00% | | | |
| OH Equivalent weight: Theoretical: | 459.4 | 459.4 | | | |
| Brookfield Viscosity: | 1360 mPa · s | | | | |
| Mn: 1912 | | | | | |
| Mw: 3935 | | | | | |
| Mw/Mn: 2.06 | | | | | |

Into a 5 L, 4 neck roundbottom flask fitted with a reflux condenser, mechanical stirrer, thermocouple, thermowatch, heating mantle, monomer inlet adapter, and maintained under a nitrogen atmosphere, kettle charge (A) was placed. After heating the mixture to 70 degrees C, the isocyanate feed (B) was added over a 2.5 to 3 hour period at a rate of approximately 11.5 ml/minute with a Masterflex peristaltic pump and #16 Viton tubing, maintaining the temperature at 70 degrees C throughout. The resin was held an additional 1.5 hours at 70 degrees C then cooled to room temperature and decanted into a 1 gallon metal can.

% Non-volatiles were measured on ca. 0.5 g samples, diluted with ca. 1.0 g 2-heptanone, stirred with a tared wire paper clip, and heated for 1 hour at 110 degrees C. Brookfield Viscosity was measured on a 25 degree C resin sample using a #4 spindle at 10.0 rpm. Molecular weights were determined by Gel Permeation Chromatography using polyethylene glycol/polystyrene standards.

The remaining Examples 7 through 11 were prepared using similar reaction procedures. The proportions of reactants and results are shown in Table I.

Example 12

Method 3, Reaction product of alcohol and part of isocyanate is mixed with remainder of isocyanate and the mixture is then added to the diol.

Polyurethane polyol made by the reaction of secondary butanol and 2-ethyl-1,3-hexanediol (EHDO) with Desmodur 3300.

| REAGENTS: | | | | |
|---|---|---|---|---|
| Reagent | Eq. Wt. | Grams | Eq's | Wt % |
| Kettle Charge (A) | | | | |
| sec. butanol | 74.12 | 224.1 | 3.023 | 5.800 |
| Methyl amyl ketone | | 257.9 | | 6.672 |
| 10% DBTDL (in butyl acetate) | | 0.9 | | 0.023 |
| Feed—(B) | | | | |
| Des3300 | 194.0 | 1,777.0 | 9.160 | 45.971 |
| Methyl amyl ketone | | 450.0 | | 11.641 |
| Kettle Charge (C) | | | | |
| EHDO | 146.0 | 896.0 | 12.274 | 23.179 |
| Methyl amyl ketone | | 257.8 | | 6.669 |
| 10% DBTDL (in Butyl acetate) | | 1.8 | | 0.047 |

DBTDL = Dibutyl tin dilaurate

Into a 5 L 4NRB flask fitted with a reflux condenser, mechanical stirrer, thermometer, monomer inlet adapter, and maintained under a nitrogen atmosphere, kettle charge (A) was placed. After heating the mixture to 70 degrees C, 40% of feed (B) was added at 8.1 ml/min (2 hrs), maintaining the temperature at 70 degrees C. The remaining 60% of feed (B) was added over 10 minutes, still maintaining the temperature at 70 degrees C. This mixture (AB) was transferred to 1 gal can and cooled to room temperature. Kettle charge (C) was placed in the original 5 L 4NRB (which prior to that was rinsed with solvent). After heating (C) to 70 degrees C, feed (AB) was added at 17.0 ml/min (2.5 hr).

After completion of the feed addition, the temperature was held at 70 degrees C. for an additional 1.5 hr. after which the mixture was cooled and transferred to a 1 gal container.

% Non-volatiles were measured on ca. 0.5 g samples, diluted with ca. 1.0 g MAX, stirred with a tared paper clip, and heated for 1 hr at 110 degrees C. Brookfield viscosity was measured using a #4 spindle, 10 rpm, at 25 degrees C. Molecular weights are by GPC, using polyethylene glycol/polystyrene standards.

Characterization
% Non-volatiles: 75.0 (theory); 74.0. (measured)
Hydroxyl equivalent weight: 472
Viscosity: 3085 mPa.s
Mn: 1526
Mw: 2807
Mw/Mn: 1.84

Acid Etch Spot Testing

The following Table II illustrates the acid etch properties of polyurethane polyol resins, modified with monofunctional alcohol (sec. Butanol). All resins were incorporated into formulations consisting of 35 wt % melamine (Cymel 303), 11% MPL-200 (a polyurethane polyol, prepared from as in Example II from HDTLV and 2-ethyl-1,3-hexanediol) (which entered the formula in a fumed silica dispersion for rheology control), 3% resin from commercial additives and 51% PUPO resin of interest. All formulas contained (based on resin solids) 0.4% Nacure 5226 acid catalyst, 2.7% Sanduvor 3206 UV absorber, 1.34% Tinuvin 440 hindered amine light stabilizer, 10.6% Aerosil R972 fumed silica, and 0.4% Coroc A-620-A2 flow agent. Substitution of the diol with monofunctional alcohol was done at $\frac{1}{3}$, $\frac{1}{2}$ and $\frac{2}{3}$ molar replacement either by blending MPL-200 (the polyurethane polyol of Example I) with a non-functional polyurethane of Example III (MPL-457) or by using resins which were prepared by reacting monoalcohol/diol combinations with Desmodur 3300 multifunctional isocyanate, utilizing the method previously described. The clearcoats were sprayed over a black acrylic/melamine basecoat, wet on wet, and baked for 17 min at 290 degrees F (metal temperature). All dry films were measured to be between 1.8 and 2.1 mils. The films were tested for acid etch resistance by the acid spot test disclosed in U.S. Pat. No. 5,130,405, column 11, previously incorporated by reference.

A simulated acid rain solution was formulated by mixing 1 normal aqueous solutions of sulfuric, nitric and hydrochloric acids at a volume ratio of 65/30/5, respectively. The resulting acid mixture had a pH of 0.2 units.

Panels prepared in Examples were tested for acid resistance. Each panel was spotted with 0.5 ml of the acid solution mentioned above, and was left standing uncovered at room temperature. Evaporated water was replaced with more acid solution at regular intervals (2 hours) so that the spot size remained the same throughout testing. At the end of the exposure time, the panel was rinsed with distilled water and allowed to dry overnight. The panels were inspected for damage the following day. The exposure times required to damage the various systems are shown below in Table II.

TABLE II

Acid Etch Spot Testing of Coatings

| Example/ Preparation method | Blend Ratio (based on resin solids) | Diol Type | Diol Level (moles) | sec-Butanol Level (moles) | Time to form a ring (hours) |
|---|---|---|---|---|---|
| Comparative Example II | — | EHDO | 1.0 | 0.0 | 9 |
| 5/1 | — | BEPD | 0.67 | 0.33 | 10 |
| 1/1 | — | EHDO | 0.67 | 0.33 | 8 |
| Blend II & V | 0.67:0.33 | EHDO | 0.67 | 0.33 | 8 |
| 3/1 | — | EHDO | 0.5 | 0.5 | 7 |
| Blend II & V | 0.5:0.5 | EHDO | 0.5 | 0.5 | 10 |
| 4/1 | — | EHDO | 0.33 | 0.67 | 10 |
| Blend II & V | 0.33:0.67 | EHDO | 0.33 | 0.67 | 10 |
| Commercial acrylic control* | — | — | — | — | 3 |

*A commercially produced melamine crosslinked acrylic clearcoat.

Several important conclusions can be reached from these data:

1) Polyurethane polyols can be prepared from mixtures of monofunctional alcohols and diols to give coatings with acid etch resistance. However, as seen in Table I, the viscosities of these "modified" polyurethane polyols were lower than those of the conventional polyurethane polyols such as Comparative Examples I, II and III.

2) There is no large difference between the acid etch resistance properties of coatings based on blending non-functional polyurethane polyols and fully diolderived polyurethane polyols, and coatings based on polyurethane polyols having the same level of monofunctional alcohol reacted into the polyol in a statistically random manner.

3) Polyurethane polyols prepared from 2-butyl-2-ethyl-1,3-propanediol (BEPD) are better than those prepared from 2-ethyl-1,3-hexanediol. The species prepared from BEPD produce coatings having greater acid etch resistance. While not wishing to be bound by theory, it is believed that this is due to steric hindrance provided by the bulky butyl groups.

Comparative Examples VI TO X

The resin solution from Example I (a conventional polyurethane polyol) was used to formulate melamine crosslinked clear coatings at 30 and 45% by weight hexamethoxymethyl melamine, based on total resin solids. For the sake of comparison, a typical hydroxy functional polyacrylate was formulated into coatings at the same levels of melamine. All samples were catalyzed, with an acid catalyst such as Nacure 5226 available from King Industries, at 0.3.8% active catalyst based on resin solids. Samples were reduced to 60% nonvolatile (NV) with butyl acetate and were drawn down at 1.5–1.8 mils dry film thickness on aluminum test panels. The coatings were cured 30 minutes at about 250° F.

The panels produced in these Examples were subsequently tested for acid resistance as described above for the Examples of Table III.

TABLE III

| EX/POLYMER | MELAMINE LEVEL | HOURS TO FIRST SPOT | HOURS TO FILM DEGRADATION |
|---|---|---|---|
| VI Hydroxy-functional Polyacrylate | 30% | 4 | Not Degraded after 7 hrs. |
| VII Hydroxy-functional Polyacrylate | 45% | 2 | 4 |
| VIII Polyurethane-Polyol | 30% | No Spot, 7 hrs. | — |
| IX Polyurethane-Polyol | 45% | No Spot, 7 hrs. | — |
| X Two Component Acrylic Urethane | | No Spot, 7 hrs. | — |

The above data, suggest that a significant improvement in acid resistance can be obtained by the replacement of an acrylic resin with a polyurethane polyol of co-assigned U.S. Pat. No. 5,155,201. The melamine crosslinked polyurethane-polyol coatings displayed acid resistance approaching that of a two component acrylic urethane control, which is known for its acid resistance. The two-component coating was an acrylic urethane based on a hydroxy functional polyacrylate resin, which was crosslinked with Desmodur N-3390 from Miles. The coatings prepared from the polyurethane polyols of the present invention provide comparable acid etch resistance when cured, with the advantage of lower viscosity during application.

Hypothetical Example XI

A single layer pigmented top coat is prepared as follows: About 150 parts by weight of polyurethane-polyol of the type described in the above Examples are placed in a mixing vessel. To this was added about 183 parts of titanium dioxide pigment (Titanox 2160 available from N. L. Chemicals Inc.). The two materials are blended using high speed dispersion equipment. After dispersion of the pigment, the following ingredients are added: About 106 parts by weight of melamine crosslinker (Cymel 303, available from Cytek): about 53 parts by weight of solvent (butyl acetate): about 12 parts by weight of blocked acid-catalyst (Nacure 5226, available from King Industries); about 96 parts by weight of an additional solvent (methyl amyl ketone); and about 150 additional parts by weight of the same polyurethane-polyol.

The nonvolatile content of the resulting white topcoat is about 65.0% by weight. This topcoat is applied to 20 gauge phosphated steel test panels using commercially available atomization spray equipment, to a dry, cured coating thickness of about 2.0 mils. The coating is dried and cured by oven baking at about 250 degrees F. for a time period of about 30 minutes.

Examples A, B, C and D

Resins A and B were prepared according to Example I of U.S. Pat. No. 5,155,201 and Comparative Examples I, II, and III above. Resins C and D were prepared according to Example V above. Table IV below shows the composition resins A, B, C and D. Resin A is identical to Example III above, and C is identical to Example V above.

TABLE IV

| Resin | Des 3300 | HDT LV | BEPD | Mono-ol |
|---|---|---|---|---|
| A | 1 eq. | | 2 eq. | |
| B | | 1 eq. | 2 eq. | |
| C | 1 eq. | | | 1 m sBUT |
| D | | 1 eq. | | 1 m EH |

Table V below shows the characterization data for resins A, B, C and D.

TABLE V

| Resin | % nv | vis, 20° C. | Mn | Mw/Mn |
|---|---|---|---|---|
| A | 69.6 | 2000 | 1865 | 1.43 |
| B | 71.0 | 1490 | 1473 | 1.23 |
| C | 69.2 | 430 | 1270 | 1.30 |
| D | 70.0 | 220 | 1216 | 1.1 |

Clear coatings were formulated from the polyurethane polyol solutions by mixing the following components in accordance with normal paint formulation techniques:

60 parts by weight (based on non-volatiles) of the polyurethane polyol solution, 40 parts by weight of a hexamethoxymethyl melamine ("HMMM")(commercially available under the trade designation CYMEL 303 from American Cyanamid)

1.0 wt % of an amine blocked dodecylbenzene sulfonic acid catalyst (commercially available under the trade designation NACURE 5226 from King Industries) and 0.1 wt % of a polybutylacrylate flow agent (commercially available under the trade designation COROC A-620-A2 from Cook Paint and Varnish).

Weight % is based upon the combined weight of the polyurethane polyol solution and HMMM.

For comparative purposes, the polyurethane polyol was replaced with a "standard" acrylic polyol having an Mn of about 3300 and a polydispersity of about 2.3, which was prepared from the following monomers:
hydroxypropyl methacrylate,
butyl methacrylate,
styrene,
butyl acrylate, and
methacrylic acid.

All samples were reduced to about 60% non-volatiles by addition of tetrahydrofuran, then drawn down with a #55 roll bar on cold rolled steel panels electrocoated according to Ford specification M64J26 and Taupe primed to Ford specification M6J152B (commercially available from Advanced Coatings Technologies Inc., Hillsdale, Mich.).

The coated panels were then baked in a Dispatch forced oven for 30 minutes at 250° F. The resulting dry film thickness was measured between 1.6–2.0 mils.

The films were. tested for acid etch resistance as described above. The results are presented in Table VI below.

TABLE VI

| Resin | Weight blend ratio based on resin solids | Time to form ring (hours) Initial | Time to form ring (hours) after 7 days recovery | MEK double rubs |
|---|---|---|---|---|
| A | — | 8 | 12 | 100+ |
| B | — | 7 | 10 | 100+ |
| A + C | 0.67:0.33 | 7 | 11 | 100+ |
| A + D | 0.90:0.10 | 8 | 12 | 100+ |
| A + D | 0.67:0.33 | 8 | 4 | 100+ |
| A + D | 0.33:0.67 | 8 | 10 | 100+ |
| B + C | 0.67:0.33 | 9 | 12 | 100+ |
| B + D | 0.90:0.10 | 9 | 12 | 100+ |
| B + D | 0.67:0.33 | 6 | 9 | 100+ |
| B + D | 0.33:0.67 | 6 | 9 | 100+ |
| acrylic control | — | 5 | 3 | 100+ |

The MEK double rub test is a standard test known in the art for determining solvent resistance. The test involves saturating a cloth with methyl ethyl ketone and rubbing the coated panels with one complete forward and backward motion over the coated surface. All panels were unchanged after 100 double rubs.

The time to form ring is expected to be higher after 7 days than the initial measurement. The result for A+D at 0.67:0.33 ratio shows 8 hours initially but shows a large drop to 4 hours after 7 days. These results are not consistent with the rest of the data. It is likely due to an insufficiently washed panel after the initial spot testing, which left some acid on the panel. The results for the control acrylic panel show a slight decrease in time to form ring. However, the initial reading was already low, so this result is more likely to be accurate.

Conclusion

Blends of polyurethane polyols with non-functional polyurethanes in melamine crosslinked coatings demonstrated acid etch resistance.similar to coatings based on polyurethane polyols and melamines only. The performance of the system was not negatively affected by the addition of nonfunctional material, as would have been expected as a result of, for instance, less crosslinking. Furthermore, the performance of the system is likely improved due to the lower viscosity of resins comprising non-functional polyurethanes. The lower viscosity may improve application characteristics, improve flow and leveling properties, and decrease overall viscosity of the finished paint. The ratios of the non-functional polyurethane to the polyurethane polyol resins were varied between 10–67%.

Blends of polyurethane polyols with non-functional polyurethanes in other coatings systems, such as in isocyanate crosslinked systems, would be expected to yield similar results to the melamine crosslinked system.

Only a limited number of preferred embodiments of the invention have been described above. However, one skilled in the art will recognize the numerous substitutions, modifications and alternations which can be made without departing from the spirit and scope of the invention as limited by the following claims.

What is claimed is:

1. A polyurethane-polyol composition comprising the reaction product of:
   (a) about one NCO equivalent of an n-functional isocyanate compound, wherein n is a number ranging from 2 to abou 5;
   (b) x moles of at 1 said diol being selected from species wherein the hydroxyl groups are separated by 2 or 3 carbon atoms; and
   (c) y moles of a compound containing from 1 to 18 carbon atoms and a single functional group capable of reacting with an isocyanate, wherein the sum of x+y is about 0.6 to 1.4 and y=about 0.25x to about 75x, provided t at the NCO/OH equivalent ratio is less than 0.976, wherein said reaction product has an $M_n$ from about 300 to about 3,000.

2. The composition of claim 1 wherein said n-functional isocyanate (a) is selected from the group consisting of the isocyanates and biurets of monomeric diisocyanates, and reaction products of diisocyanates and polyhydroxy compounds.

3. The composition of claim 2 wherein said isocyanate (a) is selected from the group consisting of hexamethylene diisocyanate, isophorone diisocyanate, tetramethyl xylylene diisocyanate, 2-methyl-1,5-pentane diisocyanate, 2,2,4-trimethyl-1,6 hexamethylenediisocyanate, 1,12-dodecane diisocyanate and methylene-bis(4-cyclohexyl isocyanate).

4. The composition of claim 1 wherein said diol is asymmetric.

5. The composition of claim 4 wherein said diol is selected from the group consisting of 2,2,4-trimethyl-1,3-pentanediol, 2-ethyl-1,3-hexanediol; 1,2-propanediol; 1,2-hexanediol; 1,2-octanediol; 1,2-decanediol, 1,2-octadecanediol and, 1,3-butanediol.

6. The composition of claim 1 wherein said diol contains hydroxyl groups which are symmetric.

7. The composition of claim 6 wherein said hydroxyl groups are all primary.

8. The composition of claim 1 wherein the isocyanate-reactive compound (c) is a single active hydrogen-containing compound.

9. The composition of claim 1 wherein said compound (c) is an alcohol or thiol characterized by the formulas

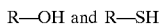

R—OH and R—SH wherein R is a hydrocarbyl group containing from 1 to 18 carbon atoms.

10. The composition of claim 9 wherein said compound (c) is an aliphatic alcohol having from 2 to 12 carbon atoms.

11. The composition of claim 1 wherein said compound (c) is an amine selected from the group represented by the formulas R—$NH_2$ and $R^1$—NH—$R^2$ and $(CH_2)_z$—NH, wherein each R, $R^1$ and $R^2$ is independently a hydrocarbyl group having from 1 to 18 carbon atoms, the sum of the carbon atoms in $R^1$ and $R^2$ also being from 1 to 18, and wherein z=from 4 to 6.

12. The polyurethane-polyol composition of claim 1 further comprising a non-functional polyurethanes.

13. A polyurethane-polyol composition comprising the reaction product of:
   (a) abowt one NCO equivalent of an n-functional isocyanate compound, wherein n is a number ranging from 2 to 5;
   (b) x moles of at least one component diol, said diol being selected from species wherein the hydroxyl groups are separated by 2 or 3 carbon atoms, and
   (d) y moles of a compound containing from 1 to 18 carbon atoms and a single functional group capable of reacting with an isocyanate, wherein the sum of x+y is about 0.6 to 1.4 and y=about 0.25x to about 75x, provided that the NCO/OH equivalent ratio is less than 0.976, wherein said reaction product has an $M_n$ from about 300 to less than about 2,600.

14. The polyurethane-polyol composition of claim 13 further comprising a non-functional polyurethanes.

* * * * *

UNITED STATES PATENT AND TRADEMARK OFFICE
CERTIFICATE OF CORRECTION

PATENT NO. : 6,753,386 B1
DATED : June 22, 2004
INVENTOR(S) : Alexander Leo Yahkind, Ian Wagstaff and Frederick Herbert Walker It is certified that error appears in the above-identified patent and that said Letters Patent is hereby corrected as shown below:

Column 22,
Line 18, delete "abou"
Line 19, change "at" to -- at least --.
Line 19, add -- component diol, -- after the number 1
Line 25, after provided change "t at" to -- that --.
Line 32, change "isocyanates" to -- isocyanurates --.

Column 23,
Line 7, change "abowt" to -- about --.
Line 12, change "," to -- ; --.

Column 24,
Line 7, change "2,600" to -- 2,500 --.

Signed and Sealed this

Sixteenth Day of November, 2004

JON W. DUDAS
*Director of the United States Patent and Trademark Office*